(12) United States Patent
Montes

(10) Patent No.: US 6,427,709 B1
(45) Date of Patent: Aug. 6, 2002

(54) AUTO SUN BUFFER ZONE

(76) Inventor: Gus Montes, 13300 Mission Tierra Way, Granada Hills, CA (US) 91344

( * ) Notice: Subject to any disclaimer, the term of this patent is extended or adjusted under 35 U.S.C. 154(b) by 25 days.

(21) Appl. No.: 09/745,766

(22) Filed: Dec. 22, 2000

(51) Int. Cl.[7] .................................................. B60J 11/00
(52) U.S. Cl. ............................... 135/88.07; 135/88.05; 160/130; 160/370.21; 296/97.9; 52/2.72
(58) Field of Search ................................ 296/141, 97.4, 296/97.8, 97.9; 160/370.21, 238, 130, 181; 135/88.07, 88.05; 52/3, 2.11, 2.17, 12.22

(56) References Cited

U.S. PATENT DOCUMENTS

| | | | | |
|---|---|---|---|---|
| 4,707,018 A | * | 11/1987 | Gavagan | 296/976 |
| 4,758,041 A | * | 7/1988 | Labeur | 296/97.8 |
| 4,762,358 A | * | 8/1988 | Levosky | 296/97.8 |
| 5,036,898 A | | 8/1991 | Chen | |
| 5,085,473 A | * | 2/1992 | Yang | 296/97.8 |
| 5,230,545 A | * | 7/1993 | Huang | 296/95.1 |
| 5,247,768 A | * | 9/1993 | Russo | 52/2.22 |
| 5,690,376 A | * | 11/1997 | Leidal | 296/99.1 |
| 5,813,172 A | * | 9/1998 | McNally | 52/2.22 |
| 6,032,718 A | | 3/2000 | Chen | |
| 6,318,393 B1 | * | 11/2001 | Glasgo | 135/88.07 |

* cited by examiner

*Primary Examiner*—Beth A. Stephan
(74) *Attorney, Agent, or Firm*—Sanford Astor

(57) ABSTRACT

This invention comprises a parked vehicle shade device called an auto sun buffer zone, which provides a buffer zone to keep the vehicle cool when parked outdoors under the sun. The shade device covers the top, front windshield, rear window, side windows, trunk and hood (all the upper surfaces) of the vehicle. A space (buffer zone) is provided between the top of the vehicle and the shade device, which provides a zone through which air can pass, which is more effective in cooling. The shade device provides protection to occupants in a parked vehicle sitting in the sun, and to the interior and exterior of an unoccupied vehicle.

19 Claims, 5 Drawing Sheets

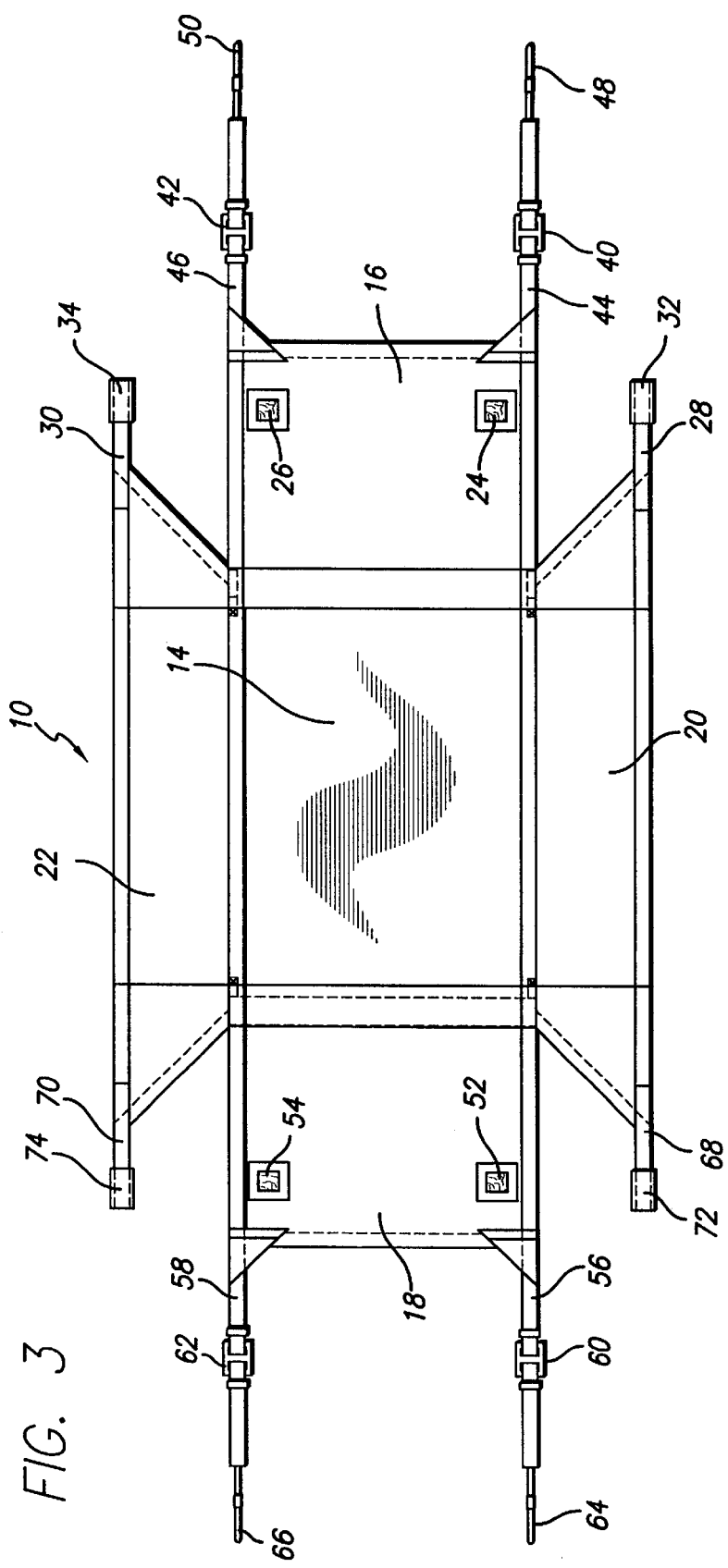
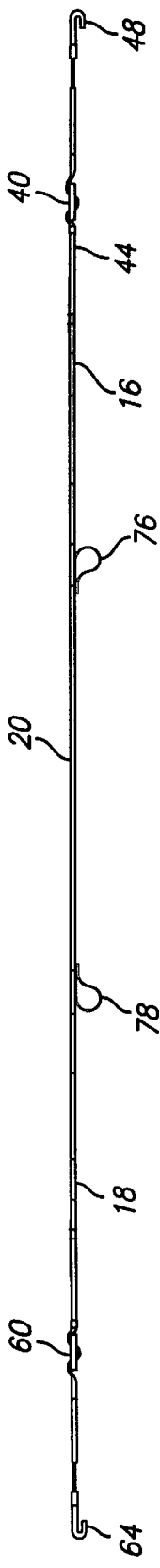

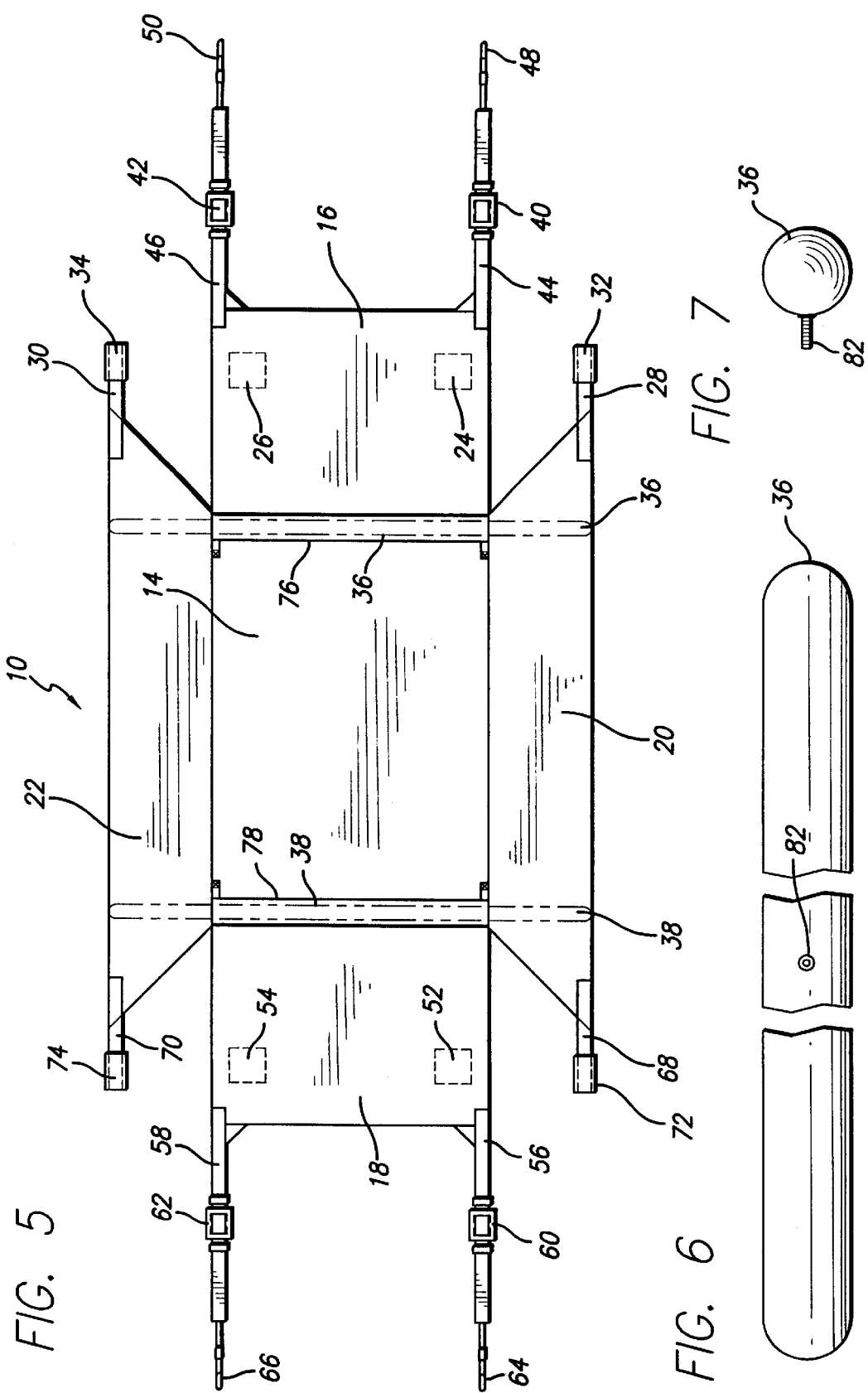

TO PUMP

AUTO SUN BUFFER ZONE

BACKGROUND OF THE INVENTION

When heat is directed at an object's surface such as a vehicle, that surface becomes heated and by continuing to be heated, this heat is absorbed into the object's interior. Heat will continue to raise the interior temperature until the heat source is eliminated, or the object reaches the temperature of the heat being generated by the heat source.

Many vehicle owners or drivers will have occasions when they want to sit in their vehicle, while it is parked outdoors in the sun. They may be waiting for someone, eating lunch or taking a rest or nap. On a hot day, with the sun shining, it is practically impossible to sit in the vehicle because the interior becomes too hot.

A shading device designed for the vehicle, which is adapted to allow a person to remain comfortably in the vehicle when it is deployed, would provide the owner or driver the ability to sit in the vehicle on a hot day, if they so desired.

SUMMARY OF THE INVENTION

The sunshade of this invention provides a shield which protects an object's surface, such as a vehicle, from the light rays and heat of the sun. The design of the shade device provides a space or buffer zone between the object and the shade device, which minimizes the heat effects to a tolerable amount. In the buffer zone, thermodynamic phases are occurring. The buffer zone area becomes filled with higher-pressure air; this higher pressure air starts to travel. As this air travels across a metal surface, it removes heat from that surface. This air now expands and travels faster, producing convection air currents all over the upper body area protected by the shade device. The sun's rays can no longer cause harm to the objects under the shade device.

The shade device of this invention comprises as its main feature, an air space of 5–6 inches between the shade device and the object being protected from the heat of the sun. In addition, the material from which the shade device is manufactured can be sunlight reflective on one side and white on the under side, providing further protection.

The shade device design comprises a plurality of panels, including a top panel, air-inflatable tubes that support the top panel, and straps which secure the shade in place. The panels of the shade which cover the surfaces of a vehicle comprise a rectangular, main, top panel, with panels on the front and back, and side, flap panels on both sides.

There are four straps, one on each corner of the front panel, and one on each corner of the back panel, with adjustment buckles and hooks for attachment. There are also four straps, one on each ear of the side flaps. These side straps attach and adjust with hook and loop, or other connection, fasteners located on the front and rear panels.

Positioned for resting on a vehicle's roof, there are sleeves attached to the underside of the main panel and also the side panels. These sleeves are for inserting inflatable air tubes or pillows. The air tubes are generally about 70 inches long and 6 inches in diameter. There are two air tubes with air filler stems located near the center of each tube. An air hose snaps onto the stems and is joined by a "Y" connector. The primary line is attached to a pump. A small hand air pump will take about one minute to inflate both tubular pillows. A 12 volt electrical pump is optional.

The outer surface of the panels may be aluminized and reflective and the inner surface may be white in color, to provide further cooling properties. The total weight of the shade device is about six pounds. The entire shade will fit into a small six inch diameter by twenty-four inch long container.

OBJECTS OF THE INVENTION

Accordingly, objects and advantages of the invention are as follows:

It is an object of the present invention to provide a vehicle shade which will keep the vehicle cool when parked outdoors in hot weather.

Another object of the invention is to provide a vehicle shade which has an air buffer zone between the vehicle's top surface and the shade.

Yet another object of the invention is to provide such a vehicle shade which is easy to store, easy to deploy, and yet allows a person to remain in the vehicle in hot and sunny weather.

These and other objects and advantages will become apparent from a detailed description of the invention and drawings which follow.

BRIEF DESCRIPTION OF THE DRAWINGS

FIG. 3 is a top view of the shade;

FIG. 4 is a side view;

FIG. 5 is a bottom view;

FIG. 6 is a side view of an air tube;

FIG. 7 is an end view of an air tube;

DETAILED DESCRIPTION OF THE INVENTION

Figure 1:
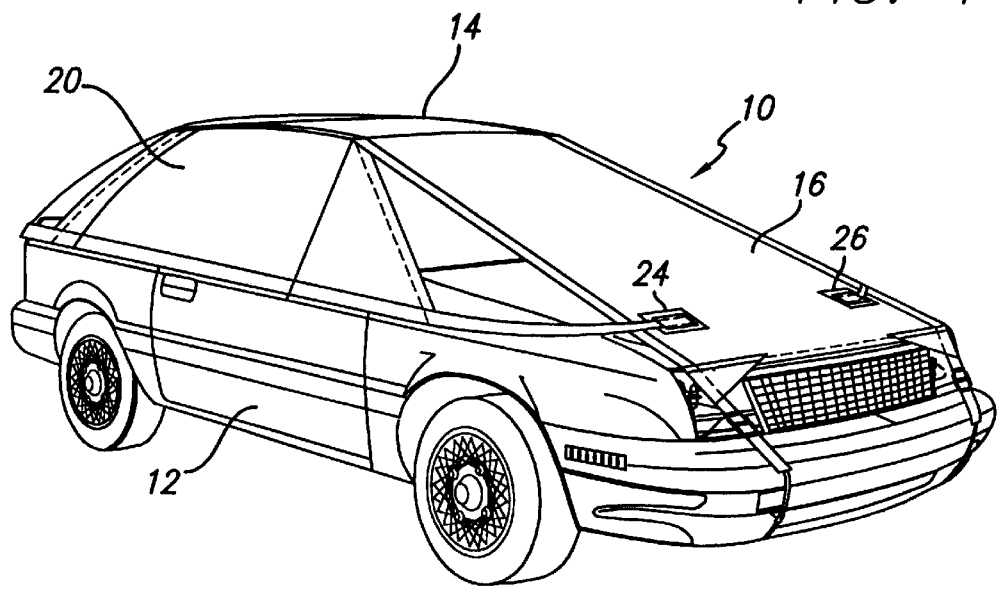
FIG. 1 is a perspective view of the shade device of this invention mounted on an automobile.

Referring now to the drawings, there is shown the shade device 10 of this invention mounted on an automobile 12. The shade comprises a top, rectangular, main panel 14, a front panel 16 and a back or rear panel 18. There are also two side panels or flaps 20 and 22.

The front panel has two hook and loop fasteners 24 and 26 adapted to receive two straps 28 and 30 which are attached to side panels 20 and 22. Straps 28 and 30 have hook and loop fasteners 32 and 34 which connect to hook and loop fasteners 24 and 26, to hold side panels 20 and 22 tightly against front panel 16 to keep side panels 20 and 22 in place.

Figure 2:
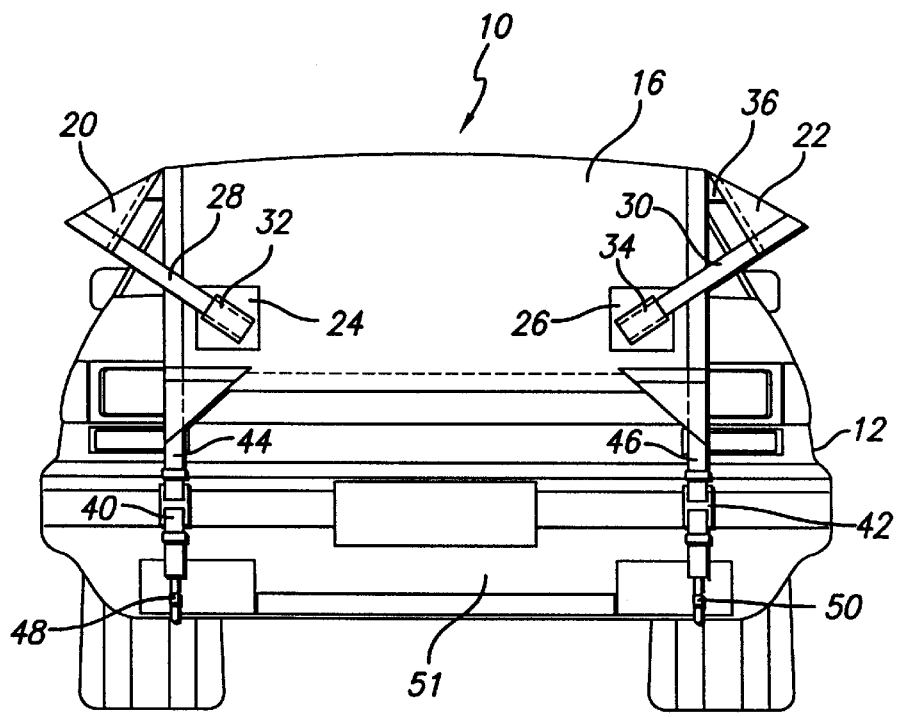
FIG. 2 is a front view.
Figure 11:
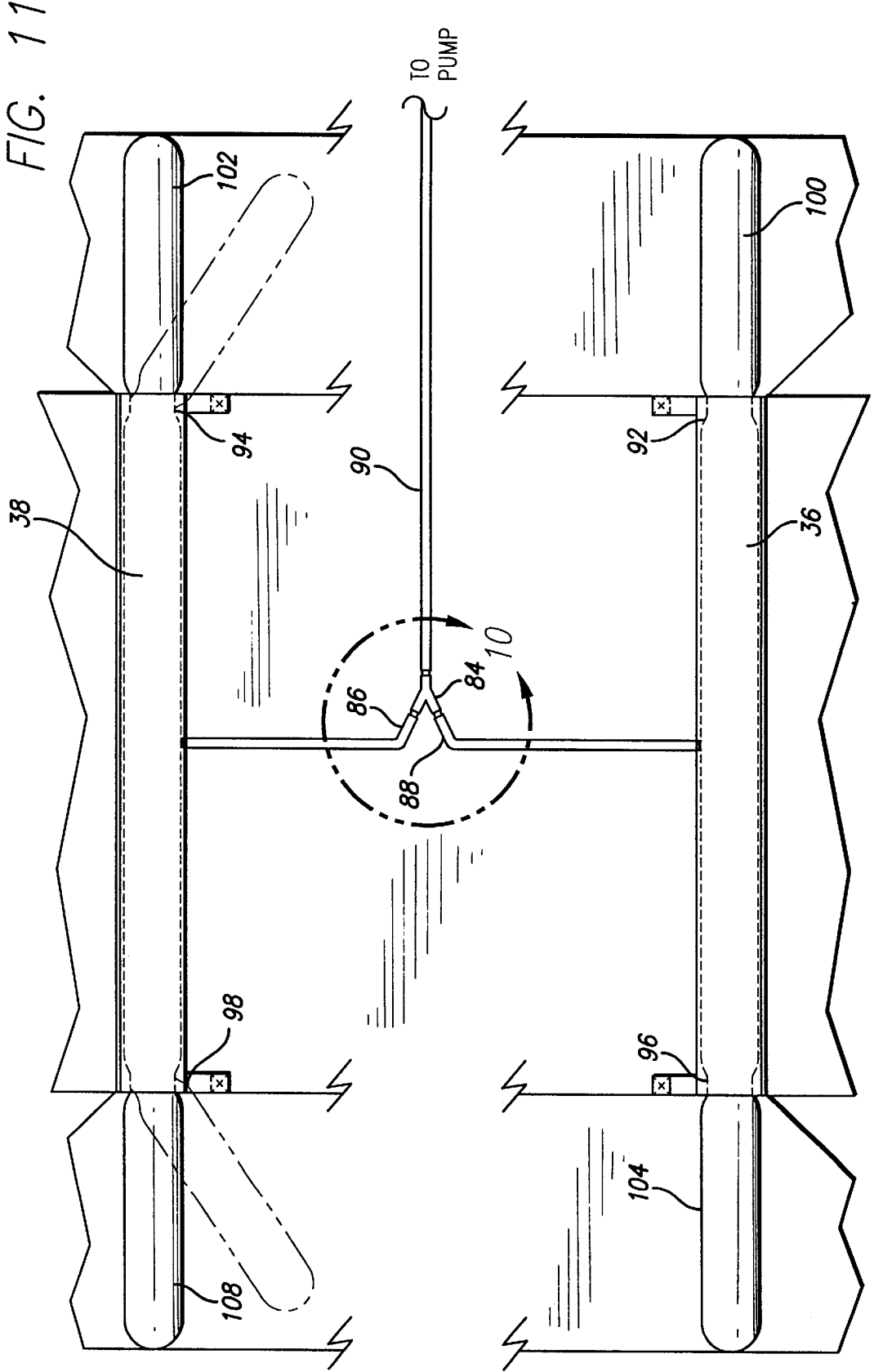
FIG. 11 is a bottom view showing the air flow system.

FIG. 2 shows side panels 20 and 22 in the "up" position, being held up by air tubes 36 and 38. FIG. 1 shows side panels 20 and 22 in the down position, against the sides of automobile 12, a position used primarily when no one is in the automobile. Air tubes 36 and 38 are made so that they are capable of bending near the edge of the roof of automobile 12 (see FIG. 11), so that side panels 20 and 22 can be folded down, if desired.

Side panel straps 28 and 30 are adjustable in length by having hook and loop material extending from the end of the strap for some distance, so that straps 28 and 30 can be pulled to tightly attach to hook and loop fasteners 32 and 34. The length needed will depend on the size and shape of the automobile. Front panel 16 has attachment straps 44 and 46 with hooks 48 and 50, to attach under front bumper 51, or other auto part, to keep front panel 16 attached down against the auto's hood. The length of straps 44 and 46 is made adjustable by any convenient means such as buckles 40 and 42.

Rear panel 18 similarly has hook and loop fasteners 52 and 54, straps 56 and 58 with adjustment buckles 60 and 62.

Straps 56 and 58 have hooks 64 and 66 to attach under the auto's rear bumper, or other auto part, to hold down rear panel 18.

Side panels 20 and 22 have rear straps 68 and 70 having hook and loop fasteners 72 and 74 to attach to hook and loop fasteners 52 and 54, similar to front panel 16.

Figure 9:
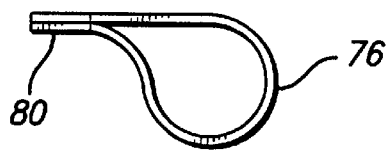
FIG. 9 is a end view of an air tube sleeve.
Figure 10:
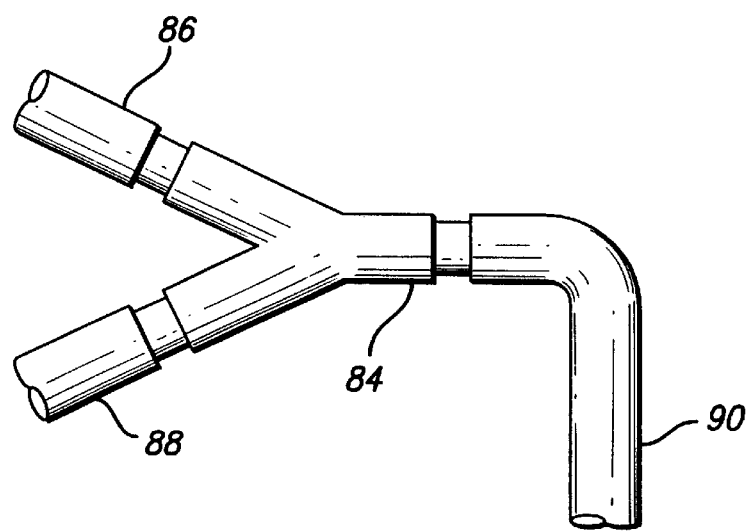
FIG. 10 is a side view of the air flow system.

As shown in FIG. 5, which shows the underside of the shade, there are two air tube sleeves 76 and 78 which are attached to the underside of top panel 14 near front panel 16 and rear panel 18. These sleeves, shown in more detail in FIG. 9, are open sleeves, adapted to receive air tubes 36 and 38 and hold them in place. They are each fixedly attached (such as by sewing) to the underside of top panel 14 at edge 80 (shown in FIG. 9) which allows sleeves 76 and 78 to swing to the inside or outside depending upon the size of the roof of the automobile on which the shade is being used. This adjustment feature makes the shade usable on smaller as well as larger automobiles.

Sleeves 76 and 78 could also be a plurality of narrow loops fixedly attached to the underside of top panel 14. More than two sleeves and air tubes can be attached to support the top panel, if desired. The space between the top of the automobile and top panel 14, created by the air tubes 36 and 38, provides an air flow which aids greatly in cooling the auto.

Figure 8:
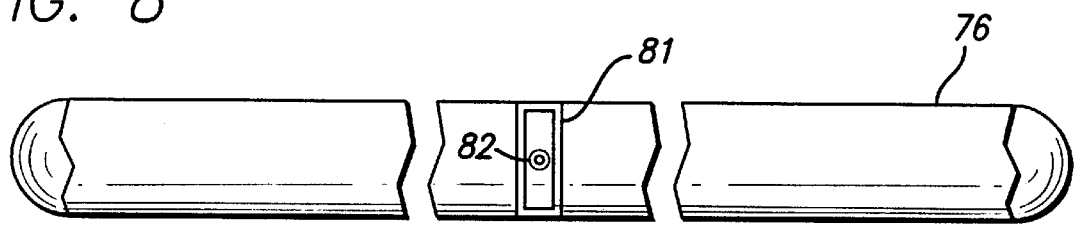
FIG. 8 is a side view of an air tube sleeve.

Sleeves 76 and 78 each have a slot 81 through which is passed air valve stem 82, (shown in FIG. 8) connected to each air tube 36 and 38. Each valve stem is connected to a "Y" connector air tubing 84 (FIG. 12) which then passes to a hand or electric air pump for filling. Branches 86 and 88 of "Y" connector 84 pass air to air tubes 36 and 38. Branch 90 goes to the air pump.

Sleeves 76 and 78 can be only long enough to reach to the edge of the roof of the automobile, while air tubes 36 and 38 are long enough to reach to the end of side panels 20 and 22, so that they can support side panels 20 and 22 in the "up" position, shown in FIG. 2. Sleeves 76 and 78 can extend all the way to the outside edge of side panels 20 and 22, if desired.

Air tubes 36 and 38 narrow at each end, at points 92, 94, 96 and 98, which is located near the end of the roof line of the automobile. This narrowing makes it easy to fold down the air tube ends 100, 102, 104, and 106 when it is desired to have side panels 20 and 22 pulled down to the sides of the automobile.

To install the shade device on a vehicle, first lay the shade on the roof of the vehicle, then open the front panel, and then open the back panel. Hook each front strap in place at the bumper or under an edge and then hook the back straps in place. Inflate the air tubes to 1–2 psi, adjust the hook and loop (Velcro) straps as desired for either the up or down position. This procedure should take under 30 seconds with some practice. The air hose will dangle through an open window. A hand air pump is attached and requires about 10 full strokes to inflate to the full pressure. After the air tubes are filled, the air hose can be disconnected or left under the sunshade top panel.

An anti-theft cable, attached to the shade, may be secured by closing the windows over the cable to a snug position. This anti-theft device is intended for use when the vehicle is left unattended. If the vehicle is to be left unattended, the side panels can be pulled down to the sides of the vehicle and the straps adjusted to hold them down against the windows.

The outer surface of the panels may be aluminized and reflective and the inner surface may be white in color, to provide further cooling properties. The total weight of the shade device is about six pounds. The entire shade will fit into a small six inch diameter by twenty-four inch long container.

The sun buffer shade may be made of any suitable fabric such as nylon or polyester. A particularly suitable fabric is an aluminized reflective polyester fabric which has one side that has an aluminized mylar coating that reflects sunlight and reduces heat absorption. The nonreflective side is white laminated vinyl.

To remove the shade, a quick disconnect and a pressure relief valve can be provided to remove the air from the air tubes, fold the shade and store it quickly.

Having thus described the invention,

I claim:

1. A shade device for a vehicle comprising a top panel, a front panel, a back panel and two side panels, means to removably attach the side panels to the front and rear panels, a plurality of air tubes, removably attached to the underside of the top panel, means to inflate the air tubes with air.

2. The shade of claim 1 in which the means to attach the side panels comprises straps having hook and loop fasteners.

3. The shade of claim 1 in which the means to removably attach the air tubes comprises a plurality of sleeves, fixedly attached to the underside of the top panel.

4. The shade of claim 1 further comprising straps fixedly attached to the front and rear panels, hooking means attached to the ends of said straps for removable attachment to a portion of the vehicle.

5. The shade of claim 1 in which the outer surface of the shade has a reflective surface.

6. The shade of claim 1 in which the undersurface of the shade is white in color.

7. The shade of claim 4 further comprising means to adjust the length of each strap.

8. The shade of claim 7 in which the adjusting means comprise buckles.

9. The shade of claim 1 in which the air tubes narrow adjacent the side panels allowing the air tubes to bend.

10. A shade device for a vehicle comprising a top panel, a front panel, a back panel and two side panels, strap means to removably attach the side panels to the front and rear panels, sleeve means removably attached to the underside of the top panel adapted to receive a plurality of air tubes, means to inflate the air tubes with air.

11. The shade of claim 9 in which the means to attach the side panels comprises straps having hook and loop fasteners.

12. The shade of claim 10 in which the means to removably attach the air tubes comprises a plurality of sleeves, fixedly attached to the underside of the top panel.

13. The shade of claim 10 further comprising straps fixedly attached to the front and rear panels, hooking means attached to the ends of said straps for removable attachment to a portion of the vehicle.

14. The shade of claim 10 in which the outer surface of the sunshade has a reflective surface.

15. The shade of claim 10 in which the undersurface of the shade is white in color.

16. The shade of claim 13 further comprising means to adjust the length of each strap.

17. The shade of claim 16 in which the adjusting means comprise buckles.

18. The shade of claim 10 in which the air tubes narrow adjacent the side panels allowing the air tubes to bend.

19. The shade of claim 10 further comprising a pressure relief valve to remove the air from the air tubes.

* * * * *